United States Patent
Hohm et al.

(10) Patent No.: US 11,292,453 B2
(45) Date of Patent: Apr. 5, 2022

(54) METHOD FOR OPERATING A MOTOR VEHICLE WITH HYBRID DRIVE, AND MOTOR VEHICLE WITH HYBRID DRIVE

(71) Applicant: AUDI AG, Ingolstadt (DE)

(72) Inventors: Christopher Hohm, Munich (DE); Michael Vogt, Munich (DE); Norbert Breimhorst, Ingolstadt (DE); Stefan Appel, Munich (DE)

(73) Assignee: AUDI AG, Ingolstadt (DE)

( * ) Notice: Subject to any disclaimer, the term of this patent is extended or adjusted under 35 U.S.C. 154(b) by 288 days.

(21) Appl. No.: 16/583,631

(22) Filed: Sep. 26, 2019

(65) Prior Publication Data

US 2020/0148192 A1 May 14, 2020

(30) Foreign Application Priority Data

Nov. 12, 2018 (DE) .......................... 102018219210.3

(51) Int. Cl.
*B60W 20/40* (2016.01)
*B60W 10/06* (2006.01)
(Continued)

(52) U.S. Cl.
CPC ............. *B60W 20/40* (2013.01); *B60K 6/387* (2013.01); *B60K 6/442* (2013.01); *B60W 10/06* (2013.01);
(Continued)

(58) Field of Classification Search
CPC ........... B60W 10/06; B60W 2510/068; B60W 2510/0694; B60W 2710/08; B60W 10/02;
(Continued)

(56) References Cited

U.S. PATENT DOCUMENTS

| 2007/0204601 A1* | 9/2007 | Ishii | ..................... B60W 10/107 60/295 |
| 2009/0043437 A1* | 2/2009 | Shiino | ............. B60W 30/18109 701/22 |
| 2013/0174536 A1* | 7/2013 | Yacoub | .................. B60W 20/40 60/274 |

FOREIGN PATENT DOCUMENTS

| DE | 10201621 A1 | 7/2003 |
| DE | 10202531 A | 8/2003 |

(Continued)

OTHER PUBLICATIONS

Examination Report dated Jul. 29, 2019 in corresponding German application No. 102018219210.3; 20 pages.

*Primary Examiner* — Marthe Y Marc-Coleman
(74) *Attorney, Agent, or Firm* — Maier & Maier, PLLC

(57) ABSTRACT

Method for operating a motor vehicle with a hybrid drive, which includes an internal combustion engine connected to an exhaust system of the motor vehicle along with at least one traction electric motor, which is operated via an electric energy accumulator of the motor vehicle and can be coupled to the internal combustion engine, wherein the motor vehicle can be moved via the internal combustion engine and/or the traction electric motor, wherein when movement of the motor vehicle via the internal combustion engine is switched to movement of the motor vehicle solely via the traction electric motor, and the internal combustion engine is decoupled from the traction electric motor, operation of the internal combustion engine is continued, dependent upon at least one piece of exhaust system information describing a condition of the exhaust system.

10 Claims, 1 Drawing Sheet

(51) Int. Cl.
*B60W 10/08* (2006.01)
*B60K 6/387* (2007.10)
*B60K 6/442* (2007.10)

(52) U.S. Cl.
CPC ....... *B60W 10/08* (2013.01); *B60W 2510/068* (2013.01); *B60W 2710/0694* (2013.01); *B60W 2710/08* (2013.01); *B60Y 2200/92* (2013.01)

(58) Field of Classification Search
CPC ....... B60W 20/16; B60K 6/387; B60K 6/442; B60K 6/48; B60Y 2200/92; Y02T 10/40; Y02T 10/62; F01N 9/00
See application file for complete search history.

(56) References Cited

FOREIGN PATENT DOCUMENTS

| | | |
|---|---|---|
| DE | 102010016188 A1 | 11/2010 |
| DE | 102013205221 A1 | 9/2014 |
| DE | 102015008289 A1 | 12/2016 |

\* cited by examiner

METHOD FOR OPERATING A MOTOR VEHICLE WITH HYBRID DRIVE, AND MOTOR VEHICLE WITH HYBRID DRIVE

FIELD

The disclosure relates to a method for operating a motor vehicle with a hybrid drive, which comprises an internal combustion engine connected to an exhaust system of the motor vehicle, along with at least one traction electric motor that is operated via an electric energy accumulator of the motor vehicle and can be coupled to the internal combustion engine, the motor vehicle being movable by means of the internal combustion engine and/or the traction electric motor.

BACKGROUND

Motor vehicles with hybrid drives are wherein they can be operated by means of both the internal combustion engine and their traction electric motor. In particular, a purely electric mode is possible, in which the motor vehicle is moved by means of the traction electric motor. In such an electric operating phase, the internal combustion engine can be switched off so that it does not consume any fossil fuel during said phase. The fossil fuel savings that can be realized in a motor vehicle with a hybrid drive is dependent largely on the efficiency with which the drive system, composed of internal combustion engine and traction electric motor, can be controlled in dependence upon the driving status. Various methods for managing energy in motor vehicles are known in the prior art.

DE 102 02 531 A1 discloses a method for controlling a hybrid drive of a vehicle. Said hybrid drive comprises as drive motors an internal combustion engine and at least one electric motor, which can be operatively connected to a drive train of the motor vehicle. In response to a braking of the motor vehicle, the at least one electric motor is controlled in a generating operating mode on the basis of characteristic maps.

In motor vehicles that have both a traction electric motor and an internal combustion engine for powering the motor vehicle, it is desirable, in particular, to optimize the internal combustion engine not only in terms of fuel consumption, but also in terms of the emissions it generates.

SUMMARY

The object of the invention is therefore to specify a method for operating a motor vehicle with a hybrid drive that is improved with respect to the emissions of the internal combustion engine.

This object is attained according to the invention in that when movement of the motor vehicle via the internal combustion engine is switched to movement of the motor vehicle solely via the traction electric motor, and the internal combustion engine is decoupled from the traction electric motor, operation of the internal combustion engine is continued on the basis of at least one piece of exhaust gas information describing a condition of the exhaust system.

The advantage of the method according to the invention is that operation of the internal combustion engine can continue even in the decoupled state, if required by the condition of the exhaust system. For example, operation of the internal combustion engine may continue in a fueled idling mode even during an electric operating phase of the motor vehicle, in order to maintain a certain temperature in the exhaust system, for example. This may be advantageous, in particular, for the regeneration of exhaust gas purification components of the exhaust system. The continued operation of the internal combustion engine further enables a temperature-dependent function of the exhaust system to remain available immediately following a switch from movement via the traction electric motor to movement via the internal combustion engine, since heating of the exhaust system at the start of movement via the internal combustion engine is eliminated. During movement of the motor vehicle via the at least one traction electric motor, when the internal combustion engine is switched off, no heat is produced in the exhaust system that can be used to keep the exhaust system or individual components of the exhaust system warm, i.e., to keep said system or individual components at an operating temperature and/or a regeneration temperature.

The internal combustion engine of the motor vehicle can be connected to a drive train of the motor vehicle via a clutch of the motor vehicle, for example. The at least one traction electric motor may be, for example, one or more wheel-coupled or one or more transmission-coupled electric motors. The at least one traction electric motor may be coupled to the drive train via a clutch or may be permanently connected to the drive train via a belt drive or a transmission.

According to the invention, the at least one piece of exhaust system information may describe a temperature of at least one component of the exhaust system and/or a degree of fouling of a component of the exhaust system. A temperature or a degree of fouling of a component of the exhaust system can be detected by means of a sensor arranged on the component of the exhaust system, for example, and can be transmitted, for example, to a control unit of the motor vehicle, the control unit controlling the internal combustion engine, the electric motor, and/or the drive train, for example. Additionally or alternatively, the temperature or the degree of fouling of a component may be estimated by the control unit, for example, based upon current operating parameters of the motor vehicle. As the degree of fouling of a component of the exhaust system, a coating of soot on the component may be used, for example.

According to the invention, an exhaust gas purification component, in particular an exhaust filter or a catalytic converter, may be used as the component. The exhaust filter may be a particulate filter, for example, which must be heated for regeneration, i.e., to burn off the particles deposited on the filter. In addition to exhaust filters and/or catalytic converters, temperatures or degrees of fouling of additional exhaust gas purification components, in particular of exhaust gas purification components that require a minimum temperature for their operation, may also be used as exhaust system information.

In a preferred embodiment of the method, it can be provided according to the invention that the internal combustion engine is operated such that a temperature of the at least one component of the exhaust system is kept constant or within a range. The temperature of the at least one component of the exhaust system is dependent, for example, on how many exhaust gases are generated by the internal combustion engine and the exhaust gas temperature of these exhaust gases. When the temperature is measured at the component, the internal combustion engine can be adjusted so as to keep the temperature of the component constant or substantially constant, or to hold said temperature within a predefined range. Particularly for a component that requires maintenance of an operating temperature in order for it to function, this will ensure that said component is kept at its operating temperature even during the electric operating phases of the motor vehicle, so that the function of the component will be immediately available when the driving mode switches again from a purely electric driving mode to a driving mode of the motor vehicle in which the motor vehicle is moved by means of the internal combustion engine.

According to the invention, it can be provided that the decoupled internal combustion engine is loaded during operation by an electric machine coupled to the internal combustion engine. This electric machine may be a starter generator of the motor vehicle, for example, which can generate a counter-torque to the internal combustion engine operated in the decoupled state. It is also possible for an additional traction motor to be used as the electric machine, which is arranged, for example, between the internal combustion engine and a transmission or a clutch of the motor vehicle. When the internal combustion engine is decoupled, the additional traction motor can thus likewise be decoupled and can load the decoupled internal combustion engine. In that case, the motor vehicle can be driven via the traction electric motor driving a rear axle of the motor vehicle, for example.

It can further be provided according to the invention that the electric energy generated by the electric machine during operation of the decoupled internal combustion engine is stored in the electric energy accumulator of the motor vehicle and/or is used to operate the traction electric motor. This makes it possible to recover at least a portion of the energy that is supplied to the internal combustion engine for continued operation in the decoupled state, and by storing this energy in the energy accumulator of the motor vehicle, enables it to be used for moving the motor vehicle by means of the traction electric motor.

In a preferred embodiment of the invention, it can be provided that the value of a piece of recuperation information describing the maximum electric power to be generated for a recuperation mode of the traction electric motor is reduced by the amount of electric power generated by the electric machine and/or that the value of a piece of power information describing the maximum electric power to be consumed for a tractive mode of the traction electric motor is increased by the amount of electric power generated by the electric machine. During a recuperation mode of the traction electric motor in which kinetic energy of the motor vehicle is converted into electric energy, the maximum power to be generated by the traction electric motor can be reduced by the amount of electric power generated by the electric machine coupled to the internal combustion engine. This advantageously prevents an overloading of a motor vehicle electric system and/or of the electric energy accumulator, since electric power is thereby generated by both the electric machine and the drive motor in accordance with the maximum electric power to be generated. During a tractive mode of the traction electric motor, in which the motor vehicle is moved by the traction electric motor, the maximum power to be consumed by the traction electric motor can be increased by the amount of electric power generated by the electric machine coupled to the internal combustion engine. The electric power that can additionally be supplied to the traction electric motor thereby corresponds to the electric power generated by the electric machine. In this way, it can advantageously be achieved that, if the traction electric motor is designed for correspondingly higher power consumption, more electric power can be delivered to the traction electric motor than can be drawn from the energy accumulator.

For a motor vehicle with a hybrid drive according to the invention, it is provided that the motor vehicle comprises an internal combustion engine connected to an exhaust system of the motor vehicle, along with at least one traction electric motor operated via an electric energy accumulator of the motor vehicle, wherein the motor vehicle can be moved via the internal combustion engine and/or the traction electric motor, wherein the motor vehicle comprises a control unit which is configured for carrying out a method according to the invention.

All of the advantages described in reference to the method according to the invention also apply accordingly to the motor vehicle according to the invention.

BRIEF DESCRIPTION OF THE DRAWINGS

Further advantages and details of the invention will be apparent from the exemplary embodiments described below and in reference to the drawings. Shown are.

DETAILED DESCRIPTION

Figure 1:
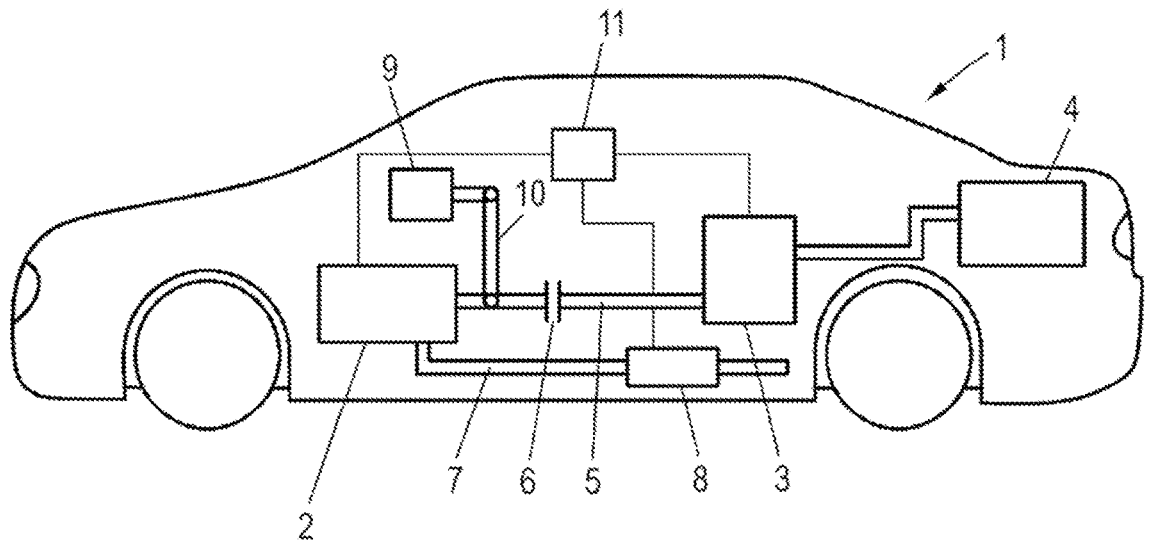
FIG. 1 a schematic side view of a motor vehicle according to the invention.

FIG. 1 shows a schematic side view of a motor vehicle 1 according to the invention. The motor vehicle has a hybrid drive and comprises both an internal combustion engine 2 and a traction electric motor 3. The traction electric motor 3 is connected to an electric energy accumulator 4, via which the traction electric motor 3 can be operated. In addition, the traction electric motor 3 is coupled to a drive train 5 of the motor vehicle 1. In addition or as an alternative to the drive train-coupled traction electric motor 3, the motor vehicle 1 may also have one or more wheel-coupled traction electric motors.

The internal combustion engine 2 is releasably connected to the drive train 5 via a clutch 6. The internal combustion engine 2 can be coupled to or decoupled from the drive train 5 by means of the clutch 6. The internal combustion engine 2 is additionally connected to an exhaust system 7 of the motor vehicle, by means of which exhaust gases produced during operation of the internal combustion engine 2 are removed. In this exemplary embodiment, the exhaust system 7 comprises a component 8, embodied, for example, as an exhaust filter, in particular as a particulate filter. The motor vehicle 1 comprises a starter generator 9, which is coupled to the internal combustion engine 2 via a belt drive 10. The starter generator 9 and the internal combustion engine 2 are coupled to one another in such a way that when the clutch 6 is open, the starter generator 9 is also decoupled from the drive train 5 as well as from the traction electric motor 3 of the motor vehicle.

The motor vehicle 1 further comprises a control unit 11, which is connected to the internal combustion engine 2, the component 8 of the exhaust system 7, and the traction electric motor 3.

The motor vehicle 1 can be moved by means of the internal combustion engine 2, and the driving mode can be switched from operation via the internal combustion engine 2 to operation via the traction electric motor 3, dependent upon the current driving state of the motor vehicle 1 and/or upon a route to be traveled by the motor vehicle 1. For this purpose, the internal combustion engine 2 and the traction electric motor 3 can be controlled, for example by the control unit 11, to switch from movement of the motor vehicle 1 via the internal combustion engine 2 to movement of the motor vehicle 1 solely via the traction electric motor 3. In this process, the internal combustion engine 2 can be decoupled by disengaging the clutch 6. During operation solely via the traction electric motor 3, no heat can be emitted to the exhaust system 7 of the motor vehicle 1, and as a result, the component 8 of the exhaust system 7 may no longer be held at a minimum temperature that is required for its operation. To prevent cooling of the exhaust system 7 and thus cooling of the component 8, for example, so that when the driving mode of the motor vehicle is switched back to movement of the motor vehicle 1 via the internal combustion engine 2, the full functionality of the component 8 of the exhaust system 7 is available immediately at the start, operation of the internal combustion engine 2 is continued by the control unit 11, dependent upon exhaust gas information describing the condition of the exhaust system 7.

Figure 2:
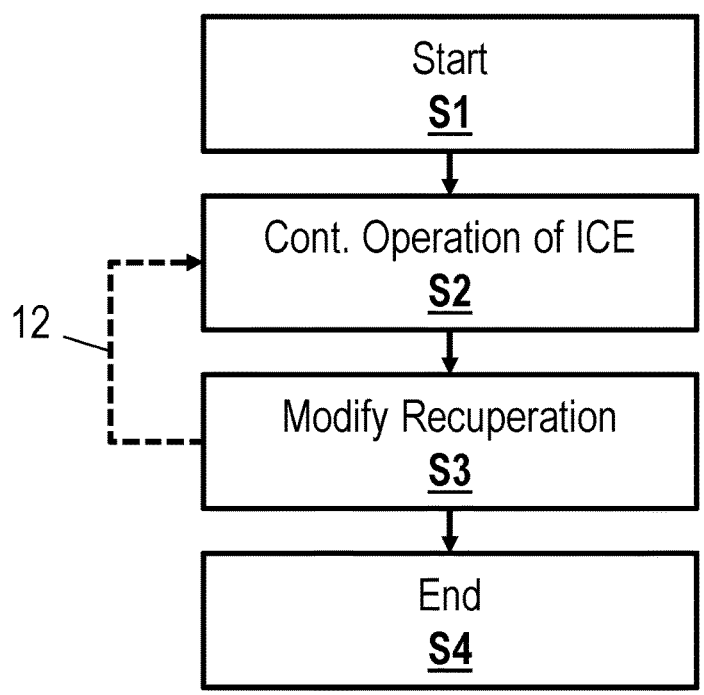
FIG. 2 a schematic flow chart of a method according to the invention.

FIG. 2 shows a flow chart of an exemplary embodiment of a method according to the invention. The individual steps are as follows:

| | |
|---|---|
| S1 | Start |
| S2 | Continued operation of the internal combustion engine |
| S3 | Modification of recuperation information and power information values |
| S4 | End |

The method according to the invention starts at step S1, before or during a decoupling of the internal combustion engine 2 from the drive train 5 during a switch from movement of the motor vehicle 1 via the internal combustion engine 2 to movement of the motor vehicle 1 via the traction electric motor 3.

In step S2, operation of the internal combustion engine 2 is continued on the basis of at least one piece of exhaust gas information that describes a condition of the exhaust system. In this exemplary embodiment, this information is a temperature of the component 8. In addition, as an alternative to this, a degree of fouling of a component 8 configured as a particulate filter can also be taken into account as the exhaust system information. In addition to considering a temperature and/or a degree of fouling of a single component, it is also possible for the temperature and/or the degree of fouling of multiple components in the exhaust system to be taken into account. Based upon a temperature of the component 8, the internal combustion engine 2 is then controlled by means of the control unit 11, so that operation of the internal combustion engine 2 is continued in the decoupled state such that the temperature of the component 8 of the exhaust system 7 is kept constant or is held within a predefined range. For this purpose, for example, an injection rate of a fuel and/or a torque to be generated by the internal combustion engine 2 can be adjusted.

During the continued operation of the decoupled internal combustion engine 2, the mechanical power generated by the internal combustion engine 2 can be at least partially recovered via the starter generator 9, which is coupled to the decoupled internal combustion engine 2, as shown in FIG. 1, via the belt drive 10, and can be stored in the electric energy accumulator 4. In this way, at least a portion of the energy of the fuel consumed by the internal combustion engine 2 in the decoupled state can be recovered and stored for later movement of the motor vehicle 1 via the traction electric motor 3. Additionally or alternatively, it is also possible for the internal combustion engine 2 to be coupled to an additional traction electric motor, arranged, for example, between the internal combustion engine 2 and the clutch 6 of the motor vehicle. When the internal combustion engine 2 is decoupled, the additional drive motor can thus likewise be decoupled, and can load the decoupled internal combustion engine 2, in which case the electric energy generated thereby can be supplied to the energy accumulator 4.

In step S3, a change in a recuperation information value and a change in a power information value take place. Said recuperation information describes the maximum electric power that may be generated by the traction electric motor 3 in a recuperation mode of said motor. The power information describes the maximum electric power that may be consumed by the traction electric motor 3 in a tractive mode. In step S3, the value of the recuperation information is reduced by the amount of electric power generated by the starter generator 9, and the value of the power information is increased by the amount of electric power generated by the starter generator 3. This ensures that the energy accumulator 4 can be charged in the recuperation mode with no more than a maximum allowable amount of electric power. For the tractive mode, this enables the maximum electric power that can be consumed by the traction electric motor 3 to be increased by the amount of power generated by the electric machine. Of course, as indicated by the arrow 12, during movement of the motor vehicle 1 via the traction electric motor 3, the continued operation of the internal combustion engine 2 can be adjusted, for example if the exhaust system information changes, followed by a readjustment of the value of the recuperation information and/or the power information.

The method ends with step S4, for example when the mode of the motor vehicle is switched from movement of the motor vehicle 1 via the traction electric motor 3 to operation of the motor vehicle 1 via the internal combustion engine 2, by engaging the clutch 6. Of course, it is also possible for the motor vehicle 1 to be driven via the traction electric motor 3 even while the internal combustion engine 2 is operating.

The invention claimed is:

1. A method for operating a motor vehicle comprising:
   a hybrid drive, which comprises an internal combustion engine connected to an exhaust system of the motor vehicle along with at least one traction electric motor, which is coupleable to the internal combustion engine and is operated via an electric energy accumulator of the motor vehicle,
   wherein the motor vehicle is movable via the internal combustion engine and/or the traction electric motor,
   wherein, when movement of the motor vehicle via the internal combustion engine is switched to movement of the motor vehicle solely via the traction electric motor, and the internal combustion engine is decoupled from the traction electric motor, operation of the internal combustion engine is continued if a temperature of at least one component of the exhaust system falls below a predetermined threshold,
   wherein the internal combustion engine is loaded during operation by an electric machine that is coupled to the internal combustion engine, thereby generating electric energy, while the internal combustion engine is decoupled from the traction electric motor,
   wherein the electric energy generated by the electric machine is stored in the electric energy accumulator of the motor vehicle and/or is used to operate the at least one traction electric motor, and
   wherein, during a recuperation mode of the motor vehicle in which kinetic energy of the motor vehicle is converted into electric energy by the at least one traction electric motor, a maximum electric power to be regenerated during the recuperation mode by the at least one traction electric motor is reduced by the electric energy generated by the electric machine while the internal combustion engine is decoupled from the at least one traction electric motor.

2. The method according to claim 1, wherein operation of the internal combustion engine is continued if a degree of fouling of a component of the exhaust system detected by a sensor exceeds a predetermined limit.

3. The method according to claim 2, wherein an exhaust gas purification component, an exhaust gas filter, or a catalytic converter is used as the component.

4. The method according to claim 2, wherein the internal combustion engine is operated such that the temperature of the at least one component of the exhaust system is kept constant or is held within a range.

5. The method according to claim 1, wherein a maximum instantaneous electric power to be consumed for a tractive mode of the traction electric motor is increased by the electric energy generated by the electric machine.

6. A motor vehicle comprising a hybrid drive which is configured to carry out the method according to claim 1.

7. The method according to claim 1, wherein the predetermined threshold is a minimum operative temperature of the at least one component of the exhaust system.

8. The method according to claim 1, wherein the predetermined threshold is a minimum regeneration temperature of the at least one component of the exhaust system.

9. The method according to claim 1, wherein the temperature is measured by a sensor arranged on the at least one component of the exhaust system.

10. The method according to claim 1, wherein the temperature is estimated by a control unit of the motor vehicle based on current operating parameters of the motor vehicle.

\* \* \* \* \*